L. E. AND W. H. CLAWSON.
DEAFENING ATTACHMENT FOR AUTOMOBILES.
APPLICATION FILED APR. 25, 1918.
1,370,880.
Patented Mar. 8, 1921.
2 SHEETS—SHEET 1.
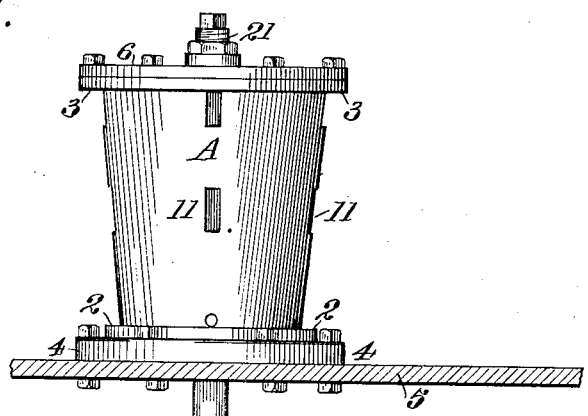
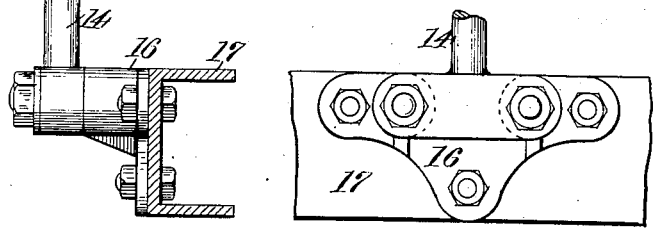
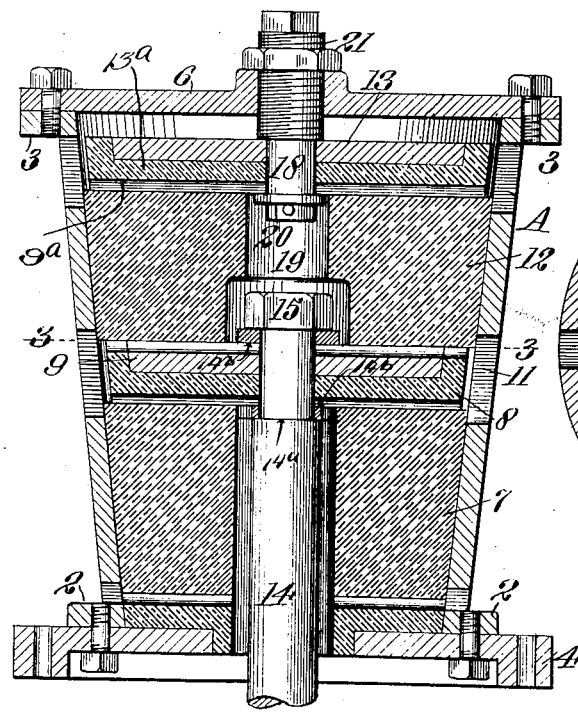
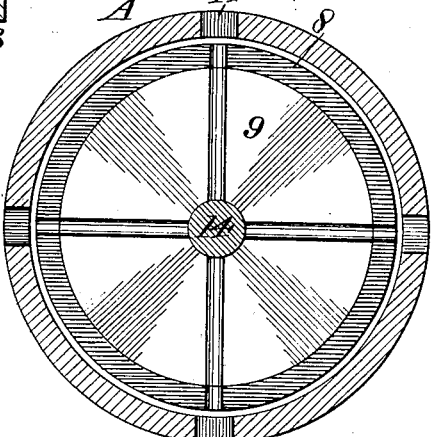
INVENTORS
Leonard E. Clawson
William H. Clawson
BY Strong & Townsend
ATTORNEYS

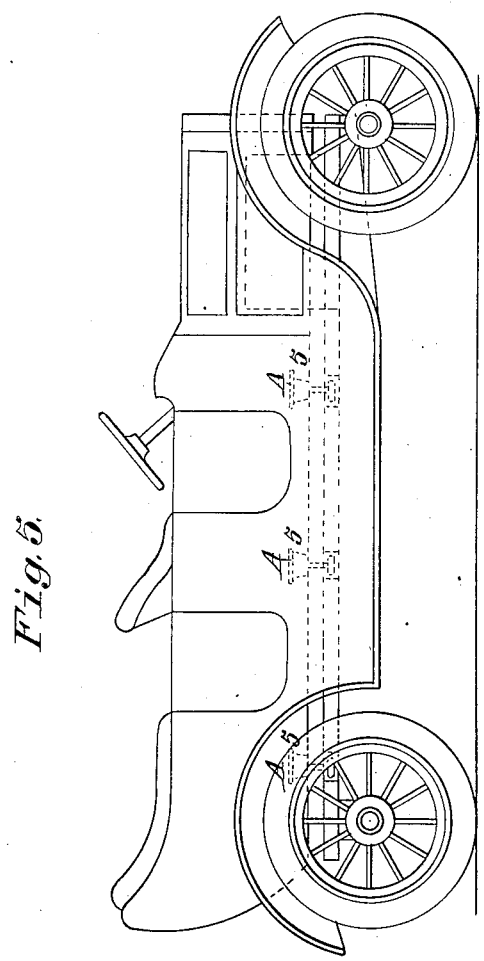

UNITED STATES PATENT OFFICE.

LEONARD E. CLAWSON AND WILLIAM H. CLAWSON, OF SAN FRANCISCO, CALIFORNIA.

DEAFENING ATTACHMENT FOR AUTOMOBILES.

1,370,880.  Specification of Letters Patent.  Patented Mar. 8, 1921.

Application filed April 25, 1918. Serial No. 230,745.

*To all whom it may concern:*

Be it known that we, LEONARD E. CLAWSON and WILLIAM H. CLAWSON, citizens of the United States, residing at the city and county of San Francisco and State of California, have invented new and useful Improvements in Deafening Attachments for Automobiles, of which the following is a specification.

This invention relates to a device to prevent the transmission of vibration and noise between the chassis and the engine bed and body of automobiles; and it consists in the introduction of a non-conductor of vibration and sound between the hard and metal parts, so as to absorb and deaden the vibration and sound which might otherwise be present.

It also includes details of construction which will be more fully explained by reference to the accompanying drawings, in which—

Figure 1 is a side elevation and partial section, showing the connection of the device with the chassis and the bed.

Fig. 2 is a vertical section of the device.

Fig. 3 is a horizontal section taken on the line 3—3 of Fig. 2.

Fig. 4 is a side view of a fragment of a chassis side rail and the attachment.

Fig. 5 shows the attachment of the device to an automobile.

The object of this invention is to reduce and deaden such vibrations and noises as are liable to occur between the steel chassis frame and other metal parts of an automobile while in operation, and this is effected by introducing between these parts an elastic non-conductor of vibrations and sound, in such a manner as to deaden the vibrations and sound.

One method of application is shown herewith, in which A is a hollow container, made tapering in form and having a metal base flange 2 and a top or cover flange 3, with holding bolts. The flange 2 is bolted to a plate 4 which rests upon and is firmly secured to the bed or body 5. A hole is made through the plate 4 and a corresponding one through the cover 6.

Mounted interior of the casing A or the chamber formed therein are a pair of vibration and sound-absorbing members 7 and 12, in this instance constructed of rubber. The member 12 is interposed between a disk 13 and a cup shaped washer 13ᵃ carried by the reduced portion of a bolt 18 adjustably secured in the cover 6 and a second cup shaped washer 8 and a disk 9 secured on the reduced portion of bolt 14, as shown in Fig. 2, the disk 13 and washer 13ᵃ being secured on bolt 18 by means of a washer 20 and a pin extending through the bolt while the washer 8 and disk 9 are secured on the reduced portion of bolt 14 by a pair of washers 14ᵇ interposed between the shoulder 14ᵃ and the nut 15. The resilient member 7 is interposed between the cup shaped washer 8 and a bottom disk suitably secured in the lower portion of the container A. The bolt 18 is threaded, as at 21, to permit it to be adjusted with relation to the cover 6, thus permitting increase in tension or the compression imposed on the resilient member 12 placed between the disk 9 and washer 13ᵃ. The lower face of the washer 13ᵃ is channeled or provided with grooves, as shown at 9ᵃ, which aline with perforations or openings formed in the container A to permit a free circulation of air through the container and between the washer 13ᵃ and the resilient member 12, thus to a great extent carrying away heat. The lower disk 9 and washer 8 are similarly grooved on both sides, said grooves alining with perforations 11 formed in the side of the container to also permit circulation of air. Both of the resilient members 7 and 12 are centrally perforated, the lower resilient member to permit free passage of the bolt 14 and the upper member 12 to permit projection of the screw 18 and the washer and nut 15, the central opening in the resilient member being indicated at 19. The bolt 14 is in this instance pivotally attached to a bracket 16 which is secured to the chassis frame 17. The frame 5 is in this manner resiliently connected with the chassis frame 17 but metallic connections between the same are broken by the resilient members 7 and 12, which in this instance are constructed of rubber or like material. The upper resilient member 12 normally supports the weight of the body 5 as the weight of the body is transmitted through the container A, cover 6, bolt 18, and washer 13ᵃ directly to resilient member 12, which in turn is supported on top of the disk 9. Said resilient member will in this manner absorb all sounds and vibrations and to this extent will prevent transmission of such vibrations from the chassis frame to the body as no metallic contact or connection is formed between the same. The lower resilient member serves the function of checking rebounds between the frames 5 and 17; that is, upward movement of the body with relation to the chassis frame will cause the washer 8 to exert a pressure on the resilient member 7, thus cushioning the upward rebound and checking the same and simultaneously preventing transmission of sound and vibrations from the chassis to the body during said rebound movement.

By this device all vibrations and sounds are deadened which might occur between the parts of the machine by contact of the steel or metallic parts. These devices are arranged in pairs connected with opposite sides of the chassis frame and bed, as indicated in Fig. 5.

The elastic non-conductor of vibrations and sounds shown at 12, functions under normal load conditions, while the elastic member 7 functions when the body rebounds. Vibrations and sounds are therefore entirely absorbed, whether the load is carried by the elastic member 12 or when the load is exerted upwardly against the member 7; for instance, when the body is rebounding.

Having thus described our invention, what we claim and desire to secure by Letters Patent is—

1. The combination with a chassis frame and the body of an automobile, of a support on the body, a cover member on said support, a bolt secured to the frame and extending upwardly into the support, a washer on the upper end of the bolt, a resilient member interposed between the washer and the cover, and a second resilient member interposed between the washer and the body.

2. A vibration and sound reducing device for automobiles comprising a casing secured to the body of the automobile, a cover for said casing, a member secured to the chassis frame of the automobile, an elastic member interposed between the first named member and the cover of the casing and a second elastic member interposed between said first-named member and the bottom of the casing.

3. A vibration and sound reducing device for automobiles comprising a casing secured to the body of the automobile, a cover for said casing, a member secured to the chassis frame of the automobile, an elastic member interposed between the first-named member and the cover of the casing, a second elastic member interposed between said first-named member and the bottom of the casing, and an adjustable member interposed between the cover and the first-named elastic member.

4. A vibration and sound reducing device for automobiles comprising a casing secured to the body of the automobile, a cover for said casing, a rod secured to the chassis frame of the automobile having its free end extending interiorly of the casing, a disk secured on the upper end of the rod, an elastic member interposed between said disk and the cover of the casing and a second elastic member interposed between the disk and a perforated bottom member secured on the casing.

5. A vibration and sound reducing device for automobiles comprising a cylindrical casing secured to the body of the automobile, a perforated bottom member on said casing, a cover on the casing, a screw extending through the cover having a disk secured on its lower end, a rod secured to the chassis frame of the automobile having its free end extending through the perforated bottom of the cylindrical casing, a disk secured on the upper free end of the rod, an elastic member interposed between said disk and the disk carried by the cover and a second elastic member interposed between said disk and the perforated bottom of the casing.

In testimony whereof we have hereunto set our hands in the presence of two subscribing witnesses.

LEONARD E. CLAWSON.
WILLIAM H. CLAWSON.

Witnesses:
JOHN H. HERRING,
W. W. HEALEY.